Dec. 22, 1953 D. H. SHEPARD 2,663,758
APPARATUS FOR READING
Filed March 1, 1951 6 Sheets-Sheet 1

INVENTOR
DAVID H. SHEPARD

BY Cushman, Darby & Cushman
ATTORNEY

INVENTOR
DAVID H. SHEPARD

BY Cushman, Darby & Cushman
ATTORNEY

Dec. 22, 1953 D. H. SHEPARD 2,663,758

APPARATUS FOR READING

Filed March 1, 1951 6 Sheets-Sheet 3

INVENTOR
DAVID H. SHEPARD

BY Cushman, Darby & Cushman

ATTORNEY

Dec. 22, 1953 D. H. SHEPARD 2,663,758

APPARATUS FOR READING

Filed March 1, 1951 6 Sheets-Sheet 4

INVENTOR
DAVID H. SHEPARD

BY Cushman, Darby & Cushman
ATTORNEY

INVENTOR
DAVID H. SHEPARD
BY Cushman, Darby & Cushman
ATTORNEY

Dec. 22, 1953 D. H. SHEPARD 2,663,758

APPARATUS FOR READING

Filed March 1, 1951 6 Sheets-Sheet 6

FIG. 11.

| | | | |
|---|---|---|---|
| A | II IV I VII III | N | II VII I III VIII |
| B | II VII III V IX | O | III V IX II VII |
| C | III V IX | P | II VII V IV I |
| D | II VII III V IX | Q | III V IX VIII II VII |
| E | II VII III IV V IX | R | II VII V IV I III |
| F | II VII IV V | S | V IX IV II VII |
| G | III V IX II VIII | T | V II VII |
| H | II VII IV I III II VII | U | VII III IV II VII |
| I | II VII | V | VIII I |
| J | IX II VII | W | VII VIII III IV II |
| K | II VII IV I III | X | III I |
| L | II VII III IV | Y | II I |
| M | II VII I III II VII | Z | V IX II VII I III |

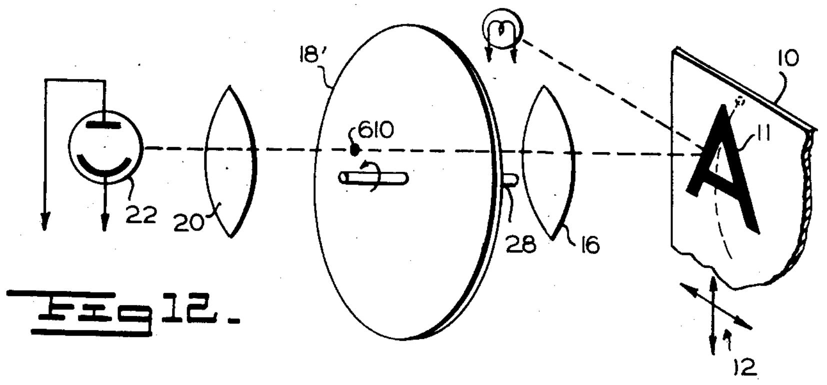

FIG. 12.

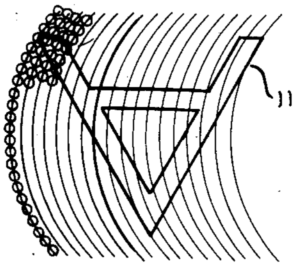

FIG. 13.

INVENTOR
DAVID H. SHEPARD

BY Cushman, Darby & Cushman
ATTORNEY

UNITED STATES PATENT OFFICE 2,663,758

APPARATUS FOR READING

David H. Shepard, Falls Church, Va., assignor to Intelligent Machines Research Corporation, Arlington, Va., a corporation of Maryland Application March 1, 1951, Serial No. 213,338

16 Claims. (Cl. 178—17)

This invention relates to methods and apparatus for interpreting information and the like.

Briefly, the invention relates to so-called reading apparatus arranged to sense printed characters, punched openings and the like and to recognize the identity of particular characters or other items passing before the sensing means so that these items may be reproduced in various forms of coding. For example, the invention may be embodied in a machine which will scan a printed page such as typewritten page and produce signals which will serve to interpret each character into any desired coding and medium for use at local or remote stations.

While many arrangements are presently known for reading characters, none of the known arrangements serve adequately to read many varieties of printed characters, nor do known arrangements make adequate provision for misalignment of characters or disfiguration of characters.

By my invention hereafter set out in greater detail, I provide apparatus which is capable of reading any sort of information which may be sensed such as printing or the like, and to do so even though the characters representing the information may be disfigured and/or incorrectly aligned. By my invention, it is also possible to distinguish among many more characters of an alphabet than is possible with known reading devices.

Accordingly, an object of my invention is to provide improved methods and apparatus for reading and interpreting printed or other information into various media.

A further object of my invention is to provide improved reading apparatus which is capable of distinguishing among a much larger number of characters than is possible with presently known equipment.

A further object of my invention, when photoelectric scanning may be employed, is to provide an electric circuit arrangement to compensate for changes in the output of a photoelectric or other light sensitive device.

A further object of my invention is to provide methods and apparatus for reading wherein the matter to be read is continuously and rapidly scanned to accommodate a large number of indications which are then combined and analyzed to provide recognition.

Further objects and the entire scope of my invention will become apparent from the following detailed description and from the appended claims. The following detailed description is made only for purposes of illustration and is not intended to limit the scope of the invention.

The invention may be further understood with reference to the accompanying drawings, in which:

Figure 11 shows a chart of indications obtained by my invention.

Figure 12 shows a modified scanning system usable with my invention.

Figure 13 shows a scanning pattern developed by the system of Figure 12.

Figures 1, 2:
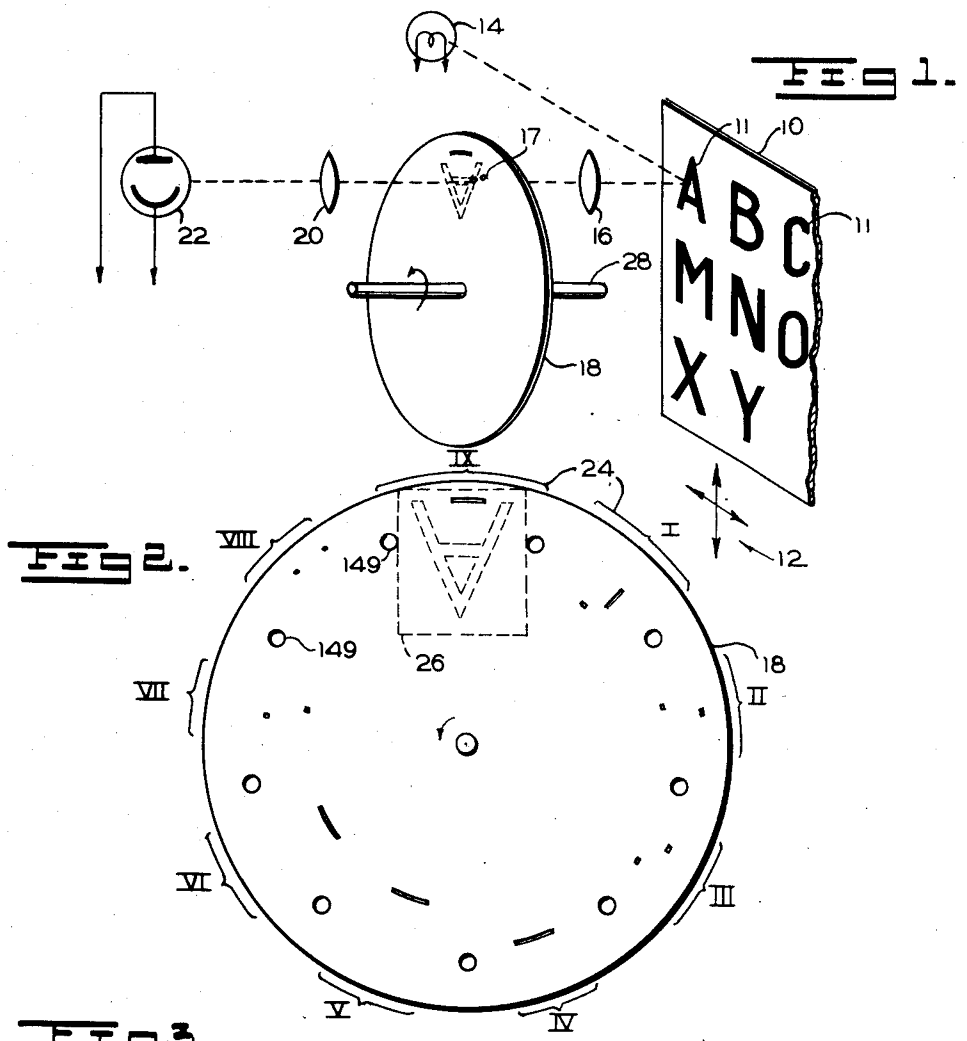
Figure 1 shows the general arrangement of scanning means according to my invention.
Figure 2 shows a representative mask used in the practice of my invention.

Referring to Figure 1, a sheet of paper 10 bearing characters 11 is arranged on a suitable support which is capable of being moved in a given plane in directions at right angles to one another. For example, if the paper 10 is held in a vertical plane the mounting means would permit the paper to be moved horizontally and vertically. These directions are indicated by the system of arrows designated generally as 12 in Figure 1. As another example, the paper 10 may be guided about a conventional typewriter roller whereby the lateral movement of the typewriter carriage in its guides will provide the analogy of the horizontal movement mentioned above and the rotation of the carriage about its axis will provide the analogy of the vertical movement described above. It will be understood that the position of the paper is not important and many varieties of mounting means may be employed. Therefore no particular means is illustrated in the drawings.

A light source 14 is provided to cast a beam of light over an area of the paper 10 sufficient to illuminate an area somewhat larger than a complete character 11. The light reflected from the paper 10 is arranged to be passed through a lens system 16 which is properly positioned to produce an image of the character 11 on the surface of a rotatable mask 18. As will be more fully explained below, the mask 18 is provided with certain openings 17 which permit portions of the light focused on the mask to pass through the mask and through a second lens system 20. The function of lens system 20 is to gather all the light which has passed through the mask 18 and focus this light in a light sensitive device 22. Device 22 may be a photoelectric cell as illustrated in Figure 1.

As will be hereafter described in greater detail, the purpose of the apparatus as thus far described is to detect what may be termed a "hit" on at least a portion of a character 11. A hit will occur when the openings of the mask are in such position relative to the image of the character 11 that a substantially reduced amount of light is available for transmission through the openings and through the lens system 20 to the light sensitive device 22. For proper recognition, the light sensitive device is permitted to "look" at the mask only in certain predetermined angular positions of the mask.

Referring to Figure 2, the mask 18 is shown with an illustrative arrangement of openings. This particular set of openings is intended for use with the scanning of an ordinary alphabet of capital letters such as is produced by a "communications" typewriter. As the description proceeds, it will become apparent that various arrays of openings may be employed with the just mentioned type of characters or with other types of characters. The mask may be considered as divided into a plurality of sectors embraced by the brackets 24 in Figure 2. In Figure 2, brackets I to IX indicate nine sectors of the mask, each sector containing an opening or openings which are employed to detect a hit on a character being read. The range of the openings in a radial direction will be limited to the possible position of a character image on the mask. That is, it will be understood that the image of a character on the mask 18 will always lie within an area such as that defined by the dash line 26 in Figure 2. Area 26 will be in fact somewhat greater than the actual dimensions of the characters being read so that even if the character is displaced from its proper alignment by a very considerable amount it will still remain within the area 26. Further for purposes of illustration, the image of the character 11 is indicated by dash lines within the area 26 as the letter A. The image may be inverted as shown due to inversions in the optical system. It will be understood that the paper 10 will be moved so that the image will progress across the area 26 from one side of the opening to the other. As the mask is continuously rotated, the light sensitive device 22 is enabled to look at the area 26 only at the instant that one of the sectors I–IX is centrally disposed over the area 26. This is carried out by means of a commutator device (to be described) which is coupled to a shaft 28 on which the mask 18 is mounted.

If the mask 18 is being rotated counterclockwise, as viewed in Figure 2, it will be apparent that as certain of the sectors I–IX are centrally disposed over the area 26 the openings of the sectors will overlie portions of the character image and therefore reduced light will reach the light sensitive device 22 when the latter is permitted to look at the area 26. The only light that will reach the light sensitive device will be that reflected because the character may not in fact be perfectly black. This reduction of light in the light sensitive device 22 will cause circuits (to be explained below) associated with the light sensitive device 22 to produce an output pulse which will be stored or remembered pending the accumulation of other possible output pulses.

Figure 3:
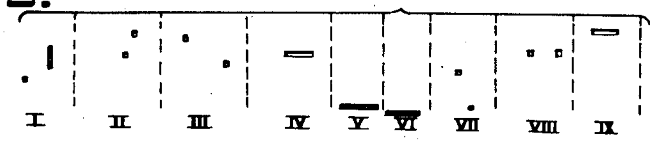
Figure 3 shows a development of openings in the mask shown in Figure 2.
Figure 4:
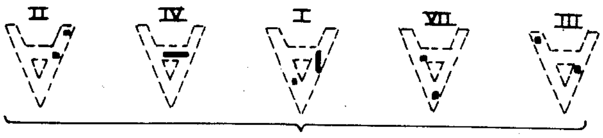
Figure 4 shows the coincidence of certain mask openings on illustrative character positions.

The relative positions of the openings of sectors I–IX may be better understood with reference to Figure 3 wherein the series of openings has been laid out in aligned fashion, as they would appear on a traveling belt. (It will be understood that a traveling belt may be employed to replace a rotatable mask, as illustrated in Figure 2, although the rotatable mask, is preferable because it avoids problems of vibration and other problems which are incident to the use of a belt.) Assuming that a letter A is being scanned, it will be apparent that as the A moves across the area 26 according to the horizontal arrow of the array 12, with the illustrated mask, the openings in sectors II, IV, I, VII and III will produce hits. That is, since the light sensitive device 22 is permitted to look at the area 26 each time each of the sectors I–IX is centered over area 26, the openings in the sectors may or may not lie at points within the boundaries of the character image at any given position of the image within the area 26 depending on the shape of the character being scanned. When the openings lie within the portion of the image, reduced light will be available to the device 22. That is, at some position of the image as the image progresses across area 26, a hit will be produced from sectors II, IV, I, VII and III. This may be best understood by reference to Figure 4. On the other hand, when the sectors V, VI, VIII and IX look at the image of the A in each of its positions within the area 26 the openings of the sectors will lie beyond the boundaries of the character image and light will be available at the device 22 and therefore no output pulse will be produced.

The speed of rotation of the mask 18 is arranged to be many times greater than the rate of movement of the paper 10. That is, as the image of the character progresses across the area 26, the mast will be rotated through a great many revolutions. For example, during the time required for the image to move completely across the area 26, the mask may have rotated 30 times. Accordingly, during a single revolution of the mask 18, the image will progress across only $\frac{1}{30}$ of the area 26 and for practical purposes it may be considered that a "look" is obtained through each of the sectors I–IX while the image is substantially in a single position. A single position may be more nearly approached as desired by a relative increase in the speed of the mask 18. Thus 270 looks may be achieved during the scanning of a given image.

It is believed to be clear from the foregoing description that a very great number of tests may be made to determine the identity of the character as the image of the character progresses across the viewing area 26.

This provision for practically continuous scanning is a very significant part of my invention since all known reading devices which read characters rely on positioning the character and then comparing the character with a single mask array. That is, in known devices no use is made of a plurality of mask arrays wherein each array is designed to register hits on different portions of different characters.

As the description proceeds, it will be apparent that not only a large number of combinations of hits may be obtained but also the permutation or order in which the hits occur may be employed to great advantage in the final decision as to the identity of the character which has been scanned.

The precise arrangement of the openings of the sectors I–IX will be determined at the discretion of the programmer in accordance with the style of the characters being scanned. Moreover, for a given style of character, several different arrangements of openings may be used. Therefore, it is to be understood that the invention is in no way limited to the illustrated arrangements of sector openings, nor to any other given arrangement. The basic novel feature is that arrangements of openings of this general type are employed in the scanning operation which is further described below.

Figure 5:
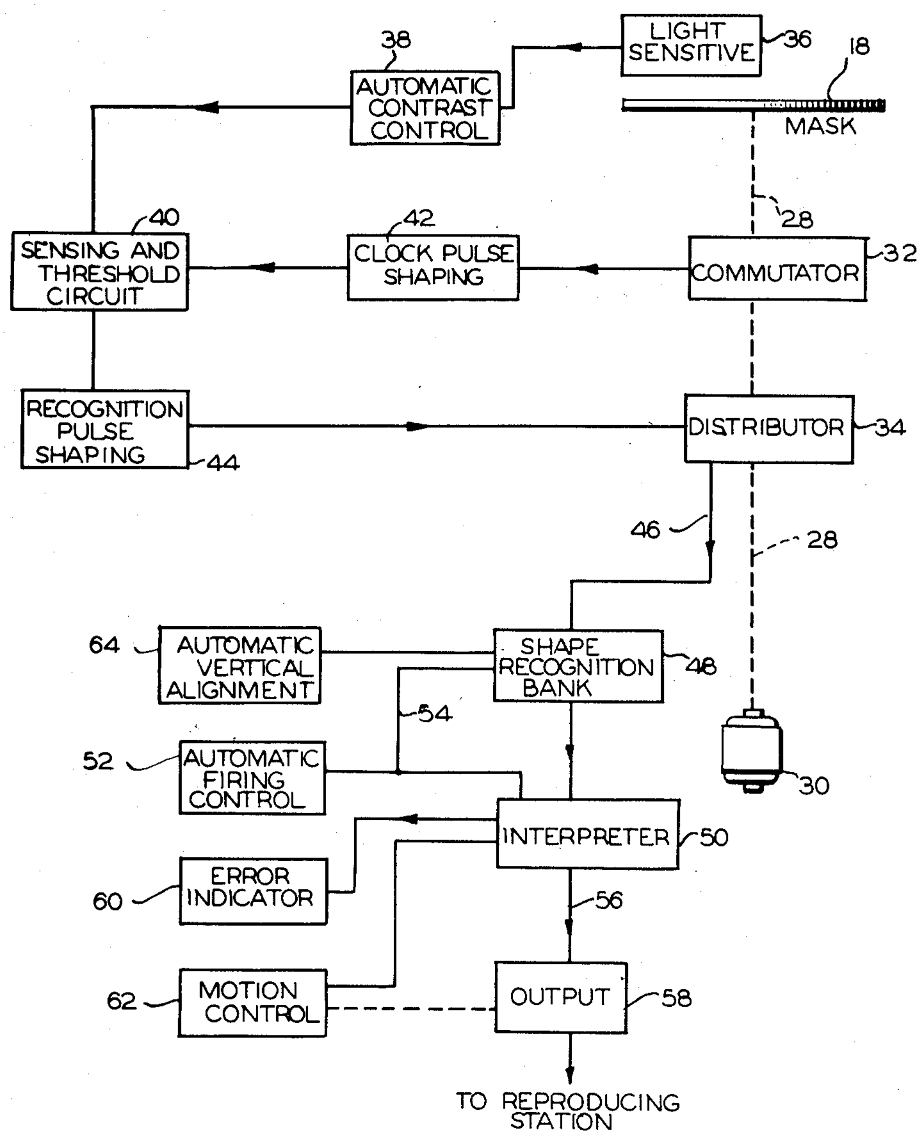
Figure 5 shows a block diagram of circuits employed in my invention.

Referring now to Figure 5, this figure shows by block diagram the novel arrangement of circuits which I employ to establish and utilize the hits obtained in the previously described detection apparatus. A motor 30 is coupled to the previously mentioned shaft 28 to rotate the mask 18. Also fixedly attached to the shaft 28 is a commutator device 32 and a distributor device 34. The last mentioned devices will be described in greater detail below but it will be understood at this point that both devices will have rotating parts which move in synchronism with the mask 18. The light sensitive device 22 will be located within the block 36 and signals obtained in block 36 due to variations in light transmission through the mask 18 will be received by an automatic contrast control circuit 38. This circuit performs the function of making adjustments for general variations in the output of the photocell circuit 36. Signals as regulated by the automatic contrast control are then applied to a sensing and threshold circuit 40. Also introduced into the circuit 40 are clock pulses obtained from a clock pulse shaping circuit 42. Signals for triggering the clock pulse shaping circuit 42 are obtained from the previously mentioned commutator device 32. The output of circuit 42 consists of sharp pulses which occur at each instant of time when the mask 18 is in position for a "look" by the photocell circuit 36. The output of the light sensitive 36 as gated in the sensing and threshold circuit 40 by clock pulses from circuit 42 is then further shaped in a recognition pulse shaping circuit 44 and pulses from circuit 44 are applied to the previously mentioned distributor device 34. The function of the distributor device 34 is to place a given recognition or hit pulse on a predetermined one of a plurality of leads contained within the transmission channel designated as 46. That is, in the illustrative embodiment there are nine sectors of the mask 18 and, accordingly, there will be nine distribution leads in the channel 46, each one identifiable with one of the nine sectors on the mask 18. The signals in transmission channel 46 are supplied to a shape recognition bank 48 which, in general, performs the function of retaining or remembering the occurrence of hits from the circuit 36 (unless ordered to forget) until a complete image has been scanned by circuit 36. As hits are recognized in circuit 48, they are transmitted to an interpreter circuit 50 which performs the function of detecting the identity of the character which has been scanned by the circuit 36. After a complete character has been scanned, an automatic firing control circuit 52 is actuated and this clears the shape recognition circuit 48 over lead 54, the result being that the interpreter 50 transmits a signal representing the identified character over line 56 to an output device 58. Device 58 may be any conventional teletypewriter or the like which will accept an input and behave differently according to which lead produces such an input. An error indicator circuit 60 is also connected to the interpreter circuit 50 and serves to indicate if the interpreter has identified an impossible character. That is, has identified a character which is not present in the alphabet being scanned and/or is not among the characters available in the output device 58. A motion control circuit 62 also provided for controlling the motion of the paper 10 in its scanning direction. That is, circuit 62 operates the carriage which supports the paper 10 to scan successive lines of a printed page. Further motion control is provided for by an automatic vertical alignment circuit 64 connected with the shape recognition bank 48. This circuit performs the function of moving the paper 10 at right angles to its scanning direction to compensate for vertical misalignment of characters along a line of print.

Figure 6:
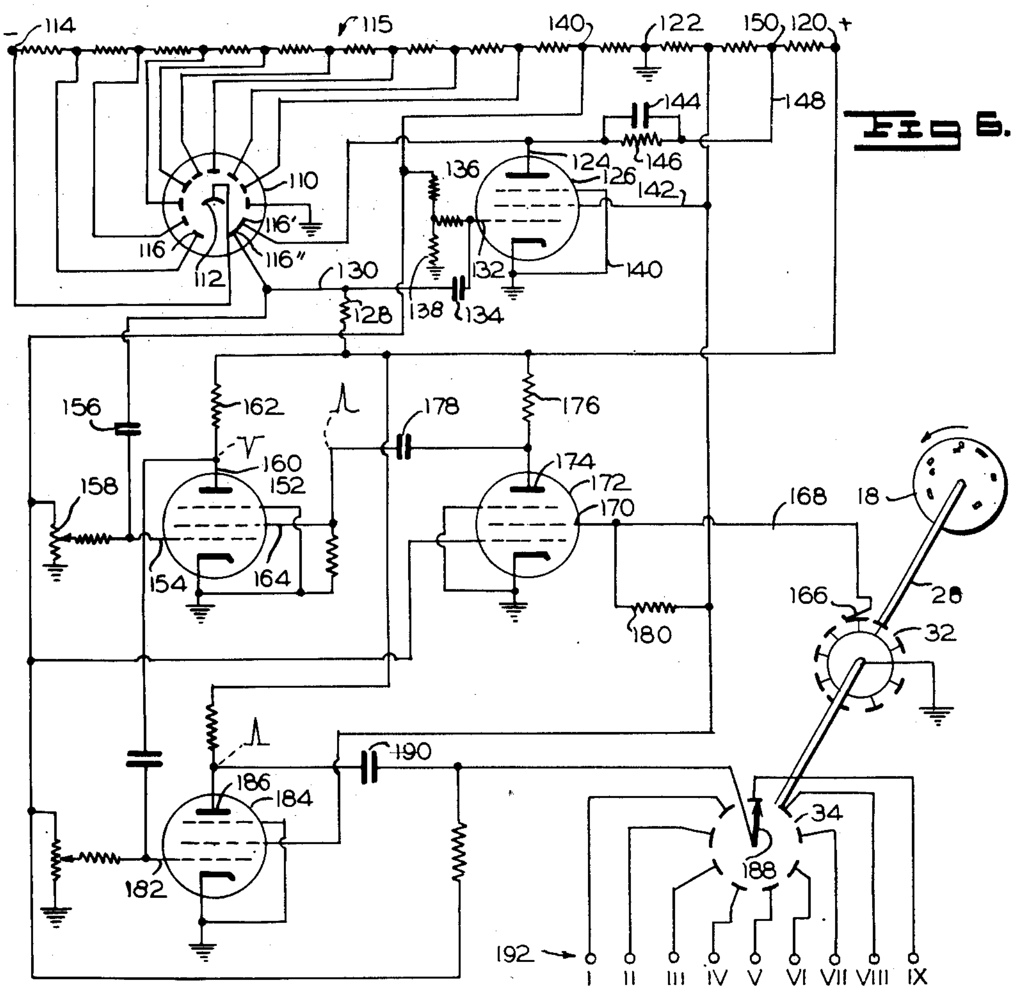
Figure 6 shows detailed circuits employed in my invention.

Referring now to Figure 6, the details of circuit blocks 32, 34, 36, 38, 40, 42 and 44 will be more fully explained. The light sensitive device 22 (Figure 1) included within the photocell circuit 36 (Figure 5) will preferably be a multiplier type photocell 110 as illustrated in Figure 6. The light receiving electrode 112 is connected to a relatively negative terminal 114 of a high voltage source 115 and the dynodes 116 of the cell 110 are connected to intermediate voltage dividing terminals such as terminal 118 so that the dynodes are at progressively more positive potentials as they progress clockwise about the cell 110, as viewed in Figure 6. The high potential source 115 is connected between terminal 114 and a more positive terminal 120 and may be grounded at a convenient point such as terminal 122.

According to a portion of my invention I provide that the next to the last dynode, designated as 116′, may be connected with the anode lead 124 of an automatic contrast control tube 126. The final dynode 116″ is then connected to the positive voltage terminal 120 through a load resistor 128.

As those skilled in the art will be aware, light falling upon the light receiving anode 112 of the cell 110 will cause electrons to impinge upon the first or most negative of the dynodes 116. These electrons are then multiplied and impinge upon the next clockwise dynode, and so forth around to the final dynode 116″. The current which flows from dynode 116″ then produces a voltage drop across resistor 128, the magnitude of this voltage depending on the amount of current which is flowing. When the amount of light falling on the electrode 112 is changed, as by a hit through the mask 18, the current flowing through resistor 128 will suddently decrease and the voltage on a line 130 connected to the dynode 116″ will move in a positive direction.

The line 130 is coupled to the control grid 132 of the contrast control tube 126 through a coupling capacitance 134. The control grid 132 is otherwise biased at about cut-off by means of a voltage divider comprising resistors 136 and 138 attached to a terminal 140 of the high potential source. The screen grid leads 140 and 142 of the tube 126 are connected with the cathode lead and with a source of high potential respectively in the usual manner. The anode 124 of tube 126 is connected to the dynode 116′, as previously described, and is also connected with a smoothing capacitance 144 and smoothing resistor 146 and these latter circuit units are connected over lead 148 to a terminal 150 of the high potential source. I have discovered that if one of the intermediate dynodes such as dynode 116' is connected, as just described, the extent of variation in the output of the final dynode 116'' may be controlled by the feedback circuit existing through the tube 126. That is, if because of the gradual failure of the light source or the sensitivity of the light collecting electrode 112 the possible output range of the photocell decreases between light and no light the amplitude of the positive swings of the grid 132 of tube 126 will decrease and the potential of the anode 124 will correspondingly increase due to a lesser amount of charge being collected on the capacitance 144. Accordingly, the potential of dynode 116' will increase as the magnitude of the grid swings decrease, and the multiplication of electrons at dynode 116' will correspondingly increase. In other words, a compensating feedback circuit is established through tube 126. Since the RC circuit 146–144 has long time constant the feedback will have only an averaging effect. Since the compensation according to the just described circuit is based on the amount of light falling on cell 110, I have found it preferable to have the total area of the openings in each sector of mask 18 substantially equal. I have found that an auxiliary opening 149 (see Figure 2) may be employed if desired, between adjacent sectors of the mask to permit light to fall on photocell 110 between "looks," although this expedient is not in any way necessary.

Turning now to the sensing and threshold circuit 40, this circuit comprises tube 152 having its control grid 154 coupled to the previously mentioned line 130 through capacitance 156. Grid 154 is otherwise biased through potentiometer resistor 158 which is connected between ground and the previously mentioned terminal 140 of the high potential source. The anode 160 of tube 152 is connected with the most positive terminal 120 of the high potential source through load resistor 162. It will be apparent from this circuit as just described, that upon each occurrence of a hit in the photocell 110, the line 130 will take a positive swing because of decreased current in resistor 128 and in doing so, a positive going pulse will be applied to the grid 154. This will cause a corresponding increase in conduction through tube 156 and the potential of the anode 160 will go through a negative swing because of the changing current through the load resistor 162. However, the just mentioned negative potential swing of the anode 160 will not take place until a second grid 164 of the tube 152 connected as a gating grid is also moved in a positive direction.

The grid 164 is under the control of the clock pulse shaping circuit 42 of Figure 5. The operation of circuit 42 is as follows: Continuing to refer to Figure 6, the shaft 28 may be connected to ground by any suitable slip ring or the like and the commutator device 32 may comprise a series of conducting segments located in the insulating periphery of a circular drum, all of these segments being interconnected to a ground through shaft 28. A brush 166 riding on the periphery of the commutator 32 will then connect a line 168 to ground a plurality of times during a single rotation of the shaft 28. The position of the commutator 32 on shaft 28 will be adjusted so that the beginning of a commutator segment will contact the brush 166 at precisely the moment when a given sector of the mask 18 is in a proper position for the light sensitive device to "look" at the image on the paper 10. The line 168 connected to the brush 166 is connected to a control grid 170 of a vacuum tube 172. The anode 174 of tube 172 is connected through a load resistor 176 to terminal 120 of the high potential source. Anode 174 is further coupled to control grid 164 of tube 152 through coupling capacitance 178. When brush 166 is not connected to ground through a segment of commutator 32, the grid 170 of tube 172 will be maintained at a predetermined voltage by means of resistor 180. However, at the moment that brush 166 contacts a commutator segment, the grid 170 will be moved to ground and a positive swing of anode 174 will result. However, due to the capacitance 178 the grid 164 will take only a short positive swing and will return to its previously existing potential. This positive swing is arranged to be of very short duration by having the RC constant of resistor 176 and capacitance 178 very small. The result of the just described circuit arrangement is that control grid 164 serves to gate the otherwise broad pulse arriving at control grid 154 and therefore produce a potential swing on anode 160 which is very sharp and which occurs at precisely the instant that the mask 18 is in position for a "look." It will be apparent from the foregoing description that when the brush 166 leaves a commutator segment, a differentiated pulse will appear on control grid 164 of tube 152 but this will be a negative going pulse and produce no useful output swing of the anode 160.

The potentiometer 158 may be employed to adjust the threshold voltage at which tube 152 will conduct to produce a pulse on anode 160.

The anode 160 of tube 152 is coupled to a control grid 182 of a further pulse shaping and clipping tube 184. Tube 184 is included within the previously mentioned recognition pulse shaping circuit 44. The anode 186 of tube 184 is then coupled to a distributor arm 188 of distributor device 34 through coupling capacitance 190. The distributor device 34 may comprise a plurality of conducting segments about the periphery of a stationary cylinder and each of these segments is connected to one of a series of terminals 192. It will be understood that the number of segments in commutator device 32 and distributor device 34 will correspond with and be aligned with the sectors on the mask 18. Accordingly, when the mask 18 is in a predetermined position, the brush 166 will have just touched a segment of the commutator 32 and therefore a clock pulse will appear at grid 164 of tube 152 and a recognition pulse will appear on distributor arm 188 if a hit was obtained in the photocell. If no hit was obtained then the grid 154 of tube 152 will have prevented an output swing of anode 160 regardless of the grid 164 having been enabled by the commutator brush 166.

To conform to the illustrated example in this specification, the terminals 192 are designated by numerals I through IX. That is, these numerals correspond to the sectors indicated on the mask in Figure 2.

Figure 7:
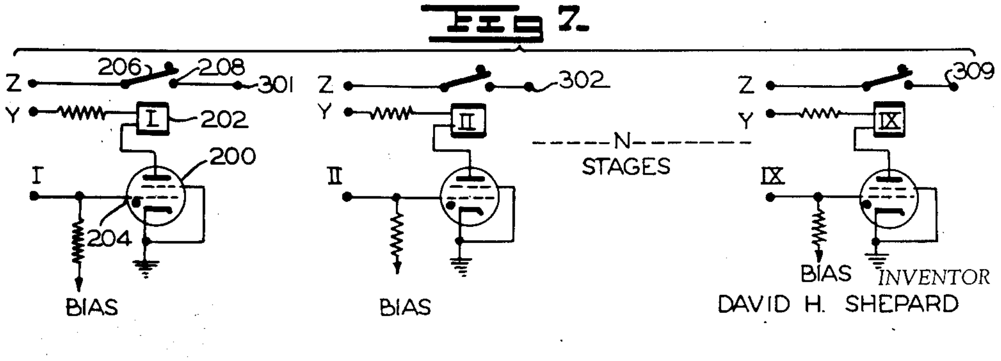
Figure 7 shows a bank of recognition circuits employed in my invention.

The shape recognition bank circuit 48 of Figure 5 will now be described in greater detail. Referring to Figure 7, this circuit consists of N stages of thyratron relay circuits, each stage consisting of a thyratron type tube 200 having a relay coil 202 connected in the anode circuit of the tube 200. The tube 200 is provided with a control grid 204 and this grid is adapted for connection either to one of the terminals 192 of the distributor device 34 or to a relay contact of interpreter circuit 50. The nature of this latter type of connection will be explained below. In Figure 7, the control grid 204 of the left hand stage is indicated as being connected to terminal I, the next stage is indicated as connected to terminal II, and the N stage is indicated as connected to terminal IX. When a given one of the control grids 204 is connected to a terminal 192 and a hit pulse appears on distributor arm 188 as this arm is in contact with the associated distributor segment, this pulse, being positive, will establish a discharge in the thyratron tube of the particular stage involved. The lead of coil 202 not connected to the thyratron anode will be connected to a normally-on source of positive potential, this source being designated Y. Discharge through the tube will energize relay coil 202 and cause a relay switch arm 206 to close a recognition circuit through a switch contact 208. The tube 200 will then continue to conduct and the switch arm will continue to be held in contact with contact 208 due to the well-known characteristic of gas filled tubes wherein conduction once established will continue regardless of the subsequent return of the control grid to its previous potential.

From the apparatus as thus far described, it will be clear that as the mask 18 continues to revolve as a character image passes across the area 26 (Figure 2) hits may or may not be obtained over each of the terminals I–IX of terminal bank 192 depending upon the identity of the particular character being scanned. It will accordingly be clear that at the completion of a given period of scanning a certain number of the stages of the shape recognition bank 48, as detailed in Figure 7, may be in a conducting condition with switch arm 206 completing a circuit through switch contact 208.

Figure 8:
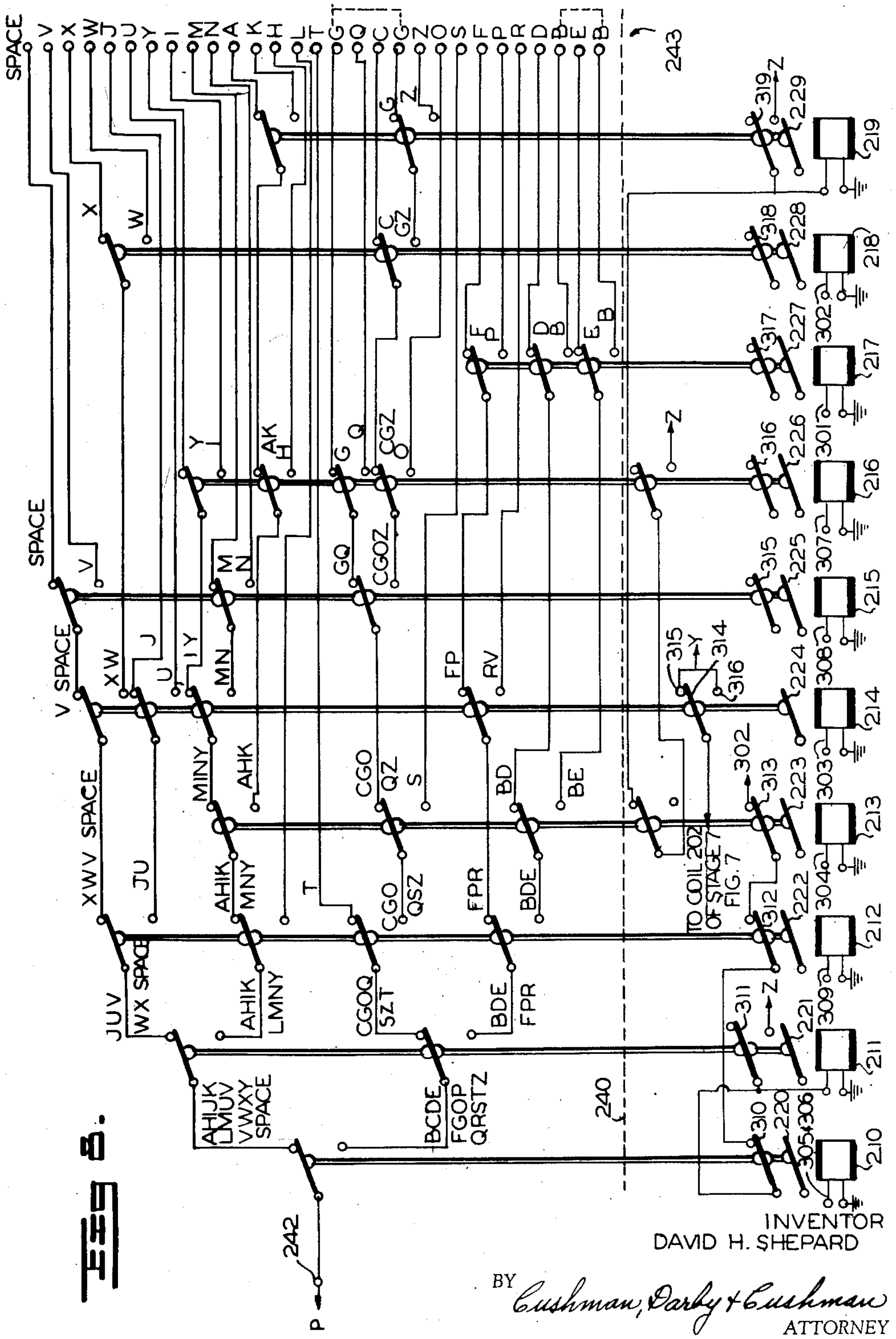
Figure 8 shows an interpreter circuit employed in my invention.

As the relay arms 206 in the shape recognition circuits establish circuits through the relay contacts 208 signals through these relays are applied to the interpreter circuit 50 (Figure 5) in order to identify the character which is being scanned. These signals are applied in the following manner:

Referring to Figure 8, an arrangement of relays is provided which will accomplish selection of the recognized character by a process of elimination. A plurality of relay coils 210 through 219 are provided for the operation of associated magnetic armatures 220 through 229 and each of the armatures through suitable mechanical linkage is adapted to operate a plurality of relay contact arms. The associated relay arms may be located in the drawing by tracing upwardly from the relay coils and the associated armature structure. Each of the relay coils 210–219 is adapted to have one of its coil terminals permanently connected to ground. In each case this is the lower terminal of the coils 210–219 as illustrated in Figure 8. The other or upper terminal of each of the relay coils 210–219 is arranged for connection to a source of potential Z either through the contact 208 of relay 202 of a stage in the shape recognition bank 48 (illustrated in Figure 7) or through contacts in its own relay system or in the relay system of other of the coils 210–219. Source of potential Z is so designated in Figures 7 and 8. As will be more fully described below, the potential source Z will have one side thereof connected to ground so that a circuit from one side of source Z through predetermined contacts will energize the coils.

The relay arms actuated by the armatures 220–229 are divided into two groups. The first group appears below the dash line 240 in Figure 8 and these relay arms and associated contacts are employed in the energization of some of the coils 210–219. The second group of relay arms and associated contacts appear in Figure 8 above the dash line 240 and these relay units serve to permit information in the recognition circuits to select between groups of characters and eventually to finally select one character representing the character which has been scanned before the mask 18.

Means are also provided for clearing the complete system following the identification of each character. These means will be fully described below.

The process of selecting the particular character which has been scanned at the mask 18 may be more readily understood by following through an example of selection using a mask having openings as illustrated in Figure 2, and an alphabet of standard capital letters as illustrated by the characters 11 on the paper 10 in Figure 1. However, it will be understood throughout this specification that the particular layout of mask openings and the particular alphabet in no way limit the invention to these forms. On the contrary, as will become fully apparent as the description proceeds, a great many combinations and permutations of mask openings may be employed to advantage with a great many types of symbols.

It will first be assumed that an A is about to be scanned by the mask 18. That is, referring to Figure 2, the image of an A will progress across the area 26 from left to right at a given rate of movement and as it does so the mask 18 will be rotated counterclockwise at high speed. For purposes of the example, the mask may rotate through more than thirty revolutions during the time required for the letter A to pass completely across the area 26. Assuming that the letter A is the first letter in a line or word, during the first revolution of the mask (just as the A enters area 26), none of the sectors will produce a hit since no part of the image will be in a position to possibly black out light passing through the openings. Accordingly, none of the control grids 204 of the thyratron tubes 200 (Figure 7) will be energized to permit the tubes to discharge. Accordingly, none of the relay arms 206 will be affected and therefore the ungrounded side of potential source Z will not be connected through relay contacts 208 (Figure 7) or in any other manner to any of the relay coils 210–219 (Figure 8). Therefore, the relay arms actuated by coils 210–219 will remain in contact with the upper contacts (to which they are normally biased by suitable spring means, not shown). Accordingly, so far as the machine is able to determine, there is no character being scanned and only a space between letters could be on the paper 10. Therefore, a terminal 242 (Figure 8) which will eventually be connected to a source of potential P would be connected through the upper relay arms in each instance to a final output terminal indicating a space. The "space" terminal is in a group of terminals 243 illustrated at the right hand end of Figure 8. In this group of terminals there are one or more terminals for each character of those being scanned.

As the leading edge of the A advances toward the center of area 26 some of the sectors will begin to produce hits. For example, when the leading edge of the A is substantially centered in area 26, sector II will produce a hit. Then since contact 208 of stage II of Figure 7 has been connected to upper terminal of coil 211 (Figure 8), all of the coil 211 relay connections will be transferred to the lower contacts. This means that as indicated in Figure 8 a selection will be made at the uppermost relay arm between a space or JUVWX on the one hand and AHIKLMNY on the other hand. That is, AHIKLMN or Y has been tentatively selected as against a space or JUVWX. The next lower relay arm at the same time will have selected BDEFPR against CGOQSZT. As other of the sectors I–IX establish hits on the letter A, other of the relay coils 210–219 will be energized and selection further made until such time that the single final path which may exist between the input terminal 242 and a bank of output terminals 243 has been established. When this circuit is established, a pulse of potential P is applied to the terminal 242 and this pulse will instantly appear at the proper output terminal.

To explain the operation of the interpreter system in another manner, it will be noted in Figure 8 that the upper terminal of the relay coil 210 is indicated as connected through a terminal designated 305 in Figure 8 to a terminal also designated 305 connected with contact 208 of the recognition circuit stage triggered by sector V. Other terminals 301–304 and 306–309 commonly designated in Figures 7 and 8 will be understood to be associated with stages I–IV and VI–IX of Figure 7, although stages III–VIII are not illustrated in Figure 7. Reference to the mask in Figure 2 and further reference to sector V as diagrammed in Figure 3 shows that the opening V will pass at the top of the image of the letter A. Since the opening in sector V is of a horizontal elongated variety, it will be apparent that the top of the letter A (which is of limited dimension) will never sufficiently block off this opening to produce a hit. It will be further apparent that in a standard alphabet of twenty-six characters, plus a space or blank, there are several other letters which are not suitably formed at their top to produce a hit on an elongated opening such as that in sector V. These other letters have been indicated in Figure 8 beside the leads leading to the right from the relay arm connected with the terminal 242. That is, along with the letter A, the letters H, I, J, K, L, M, N, U, V, W, X, Y and (space) have no solid portions extending across their top and, accordingly, are to be distinguished from the letters B, C, D, E, F, G, O, P, Q, R, S, T, and Z. The latter group of letters have portions thereof extending substantially horizontal at their tops and therefore are capable of producing a hit in sector V. Accordingly, it follows that if relay coil 210 is connected through the distributor 34 to be energized when a hit is obtained in sector V the interpreter circuit is thus informed that a definite selection must be made between the two groups of characters which have just been mentioned.

The embodiment of the invention which is illustrated in the accompanying drawings is based upon a combination of printed characters, mask openings, and a relay contact program which has been successfully operated. Because of the complexity of this type of arrangement, it is believed unnecessary to follow through a complete written description of how each of the characters of the alphabet plus a space may be eventually recognized. However, it will be a relatively simple matter for those reading this specification and drawings to trace the selection of any character through the system. Experience has shown that when using the type of mask described here it is desirable to set the threshold tube 152 to trigger when approximately 75% of the light that would be reflected in a space condition has been blacked out. Setting such a threshold leaves a considerable margin of safety in the case of shapes that should either be "totally" blacked out or not more than 50% blacked out. A margin of safety is desirable because on the one hand the "black" area of typewritten characters will in fact sometimes reflect about 15% light and on the other hand 60% black out is not an unusual occurrence when a theoretical 45% blackout is expected for the reason that heavily inked ribbon is apt to print unexpectedly broad lines as well as producing an unusually black print. Any shape versus character match that theoretically falls between about the 50% and 90% blackout levels is considered unreliable and should not be used in the interpreter program for that character. The fact that such a relatively large safety factor remains at this point is one of the most important features of this device.

For ease in correlating the circuits shown in Figures 7 and 8, the definition of numerals and letters appearing in these circuits is recapitulated in the following chart:

Roman numerals I–IX: indicate connections to segments of distributor 34, which segments are in turn identifiable with corresponding sectors of mask 18.

Numbers 301 through 309: indicate interconnections between the contacts 208 of the thyratron stages of Figure 7 and (1) the upper terminals of relay coils 210–219 of Figure 8, or (2) to relay contacts below line 240 of the interpreter (Figure 8).

P: A voltage pulse applied to terminal 242 to energize the output device.

Y: A normally-on source of potential which primarily supplies the recognition coils 202 and which is cut off momentarily following each P pulse.

Z: A normally-on source of potential which supplies coils 210–219 directly or through relay contacts below line 240. This potential is cut off momentarily following a P pulse.

(Sources of potential P, Y and Z are all connected at one side to ground.)

A further description will now be given of character selection by my invention, including the use of relay contacts below the line 240 of Figure 8. Referring to Figure 11 there is shown a table of the sequence of hits which may be expected when a mask as in Figure 2 is employed with a so-called "communications" variety of. characters. Such characters are capital letters substantially as indicated in Figure 11.

In Figure 11 each character is followed by a series of Roman numerals corresponding to sectors I to IX on mask 18. For example, the character A is following by II, IV, I, VII and III. This arrangement is intended to provide a hit is sector II; the next is sector IV and so forth. (This corresponds to the illustrated hits in Figure 4.) In reviewing Figure 11 it will be apparent that some latitude is expected as to which sectors will produce hits. For example, the openings in sector II, although not vertically aligned, will produce hits on the vertical sides of characters such as B, D, E, F and so forth. This result is carried out by having the sector openings small enough to lie within the confines of the lines making up the characters.

In arranging the interpreter program it may become advantageous to make a selection between one or more characters depending on whether one sector has produced a hit before other sectors do so. For example, referring to Figures 8 and 11, coil 211 is not directly connected to any of the lines 301–309 but instead is connected to relay arms 310 and 311 which will be actuated by coils 210 and 211, respectively. It further will be noted that a hit in sector II will supply coil 211 with potential from line 302 only if coils 213, 212 and 210 have not been energized. If any of coils 213, 212 and 210 have been energized, coil 211 cannot be energized and no selection can be made by the relay arms of coil 211 above line 240. However, if coil 211 is energized (coils 213, 212 and 210 not previously energized) a holding circuit to source Z is established through relay arm 311. The circuit involving coil 211 may therefore be termed a "one before others" circuit. It is in this instance a "II before IV, V and IX" circuit.

Another example of a "one before others" circuit is illustrated in connection with coil 219. This is a "VII before IV" circuit. Tracing this circuit, it will be observed that coil 219 will lock itself to potential Z only if line 307 energizes coil 216 before coil 213 is energized.

Circuits involving coils 210–219 may also be provided which will command stages of the recognition bank (Figure 7) to forget that a hit has previously been made by a given sector of mask 18. For example, relay arm 314 associated with relay coil 214 (Figure 8) will be connected directly to coil 202 in the thyratron plate circuit of the VII stage of the recognition circuits (Figure 7). Now if coil 214 is energized over line 303 due to a hit by sector III, relay arm 314 previously supplying coil 202 of the VII stage with potential Y over an upper contact 315 will transfer to a lower contact 316. In making this transition Y will momentarily be interrupted and the thyratron discharge will cease. Thus a hit by one sector has caused a previous hit in another sector to be cancelled or forgotten and the circuit may be termed a "one will cancel another" circuit. In this instance a III has caused a VII to be cancelled.

An "after" condition may also be established by not allowing a shape or version thereof to be connected to its thyratron grid until after another sector has been recognized. In addition an arrangement may be set up such that a shape will be connected to one thyratron before recognition of another, and to another one afterward.

It now becomes readily apparent that the number of combinations of the various "sequence conditions" that can be made is enormous. This type of programming is very useful even in programming for standard symbols such as the letters of the alphabet; but it is practically indispensible in analyzing complicated symbols and patterns because if a symbol or pattern is so elaborate that almost any shape will register a hit in some position the only thing left is the order in which these shapes are recognized.

While in Figure 8 it was convenient to show leads going directly from the output of one relay to the input of the next, in practice all leads from the coils, inputs and output of each relay may come to a plugboard, as may the output leads from the distributor, the input leads to the thyratrons, the plate circuit leads from the thyratrons and each of the various potential sources such as P, X, Y, and Z. This makes it possible to change from one program to another by merely changing a plugboard and perhaps also a mask.

Figures 9, 10:
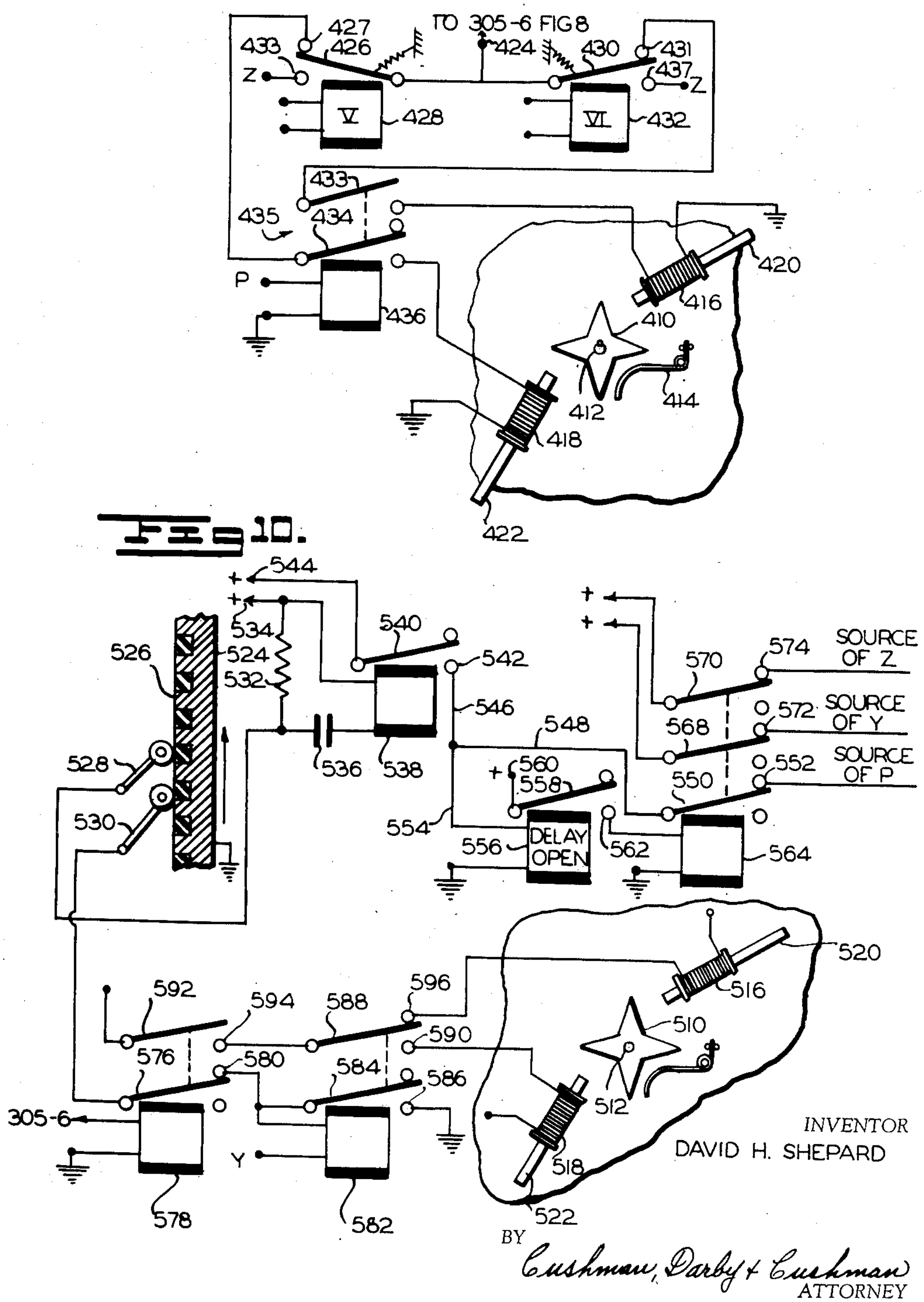
Figure 9 shows a vertical alignment circuit employed in my invention.
Figure 10 shows a firing, clearing and horizontal alignment circuit used in my invention.

Compensation for vertical misalignment may be provided for in the circuit shown in Figure 9. In Figure 9 a star wheel 410 is mounted on a rotatable shaft 412. The shaft 412 will be connected by any suitable mechanical means to adjust the means supporting the paper 10 either upwardly or downwardly with respect to its path of horizontal travel depending upon the direction of rotation of the shaft 412. A detent spring 414 is provided to retain the star wheel 410 in a given position although the spring will flex to permit the star wheel to be rotated under an externally applied force. To rotate the star wheel there are provided solenoids 416 and 418, respectively. If solenoid 416 is energized, the armature 420 will be moved toward the star wheel, striking one of the arms of the star wheel and rotating the wheel one step in a counterclockwise direction. Similarly, if the solenoid 418 is energized, its armature 422 will strike an arm of the star wheel and rotate the star wheel one step in the clockwise direction.

A determination of whether the star wheel should be turned in a clockwise or a counterclockwise direction to correct corresponding vertical misalignment is provided for by my invention in having the openings in two of the sectors of the mask 18 similar in contour but displaced in a radial direction. For example, referring to Figure 2, the openings in sectors V and VI are similar except that the opening VI is located closer to the center of mask 18 by approximately the width of the opening. Accordingly, if a character is being scanned which will produce a hit with this opening, it will produce a hit in sector V but not in sector VI if the character is in improper vertical alignment. However, terminals 305 and 306 may both be connected to the upper terminal of relay coil 210 for recognition purposes. A common terminal 424 in Figure 9 may be connected to line 305 at coil 210 (Figure 8). The terminal 424 is connected to a relay contact arm 426 associated with a first relay coil 428 (which may be the V relay of Figure 7) and also to a relay contact arm 430 associated with a second relay coil 432 (which may be the VI relay of Figure 7). That is, coils 428 and 432 may be coils 202 of stages V and VI in Figure 7 or coils 428 and 432 may be separate coils connected in parallel with coils 202 of V and VI.

Contacts 427 and 431 associated with relay arms 426 and 430 are normally in contact with arms 426 and 430. However, coils 428 and 432 when energized attract arms 426 and 430 to contacts 433 and 437, respectively. Contacts 433 and 437 are connected with potential source Z. Contacts 427 and 431 are connected respectively with relay arms 433 and 434 of a double pole single throw relay 435 having a relay coil 436 adapted to be energized by potential P at such time as a character has been completely scanned. From the circuit in Figure 9 as thus explained, it will be apparent that if sector V but not sector VI has produced a hit (meaning that the character is misaligned downwardly), relay coil 428 will be energized and the circuit through relay arm 426 will be connected to potential Z. Thus, the potential Z is applied through terminal 431 and is available at arm 433 of relay 435. Therefore, when relay 435 is closed when coil 436 is energized, the solenoid coil 416 will be energized to turn star wheel 410 in a counterclockwise direction. Turning star wheel 410 in a counterclockwise direction will serve to raise the paper 10 so that the character is properly aligned. On the other hand, if sector VI and not sector V produced a hit (meaning that the character is misaligned upwardly), the reverse of the situation is true and solenoid coil 418 will be energized to rotate star wheel 410 clockwise to lower the paper 10. If both sectors V and VI should produce hits, the character will be in satisfactory alignment and neither solenoid 416 nor 418 will operate.

It will be understood that use of sectors V and VI for correcting vertical alignment is given only for purposes of illustration, and other openings in other masks and sectors may be employed for the same purpose.

As previously mentioned, there is no direct requirement for horizontal alignment inasmuch as in my invention the characters are constantly scanned as they progress past the mask 18. However, it is apparent that means must be provided for producing an output signal and then clearing the system each time the scanning of a character has been completed. A suitable arrangement for thus controlling the system is illustrated in Figure 10. In Figure 10, a star wheel adjusting arrangement similar to that in Figure 9 is employed. In this case, star wheel 510 is fixedly mounted on shaft 512 and rotation of the star wheel will adjust the horizontal position of the bar 524 with respect to the main support with which the paper is being moved. Solenoid coils 516 and 518 together with associated slidable armatures 520 and 522 operate to rotate the star wheel 510 counterclockwise and clockwise, respectively. The main carriage means is provided with the elongated commutator bar 524 which is provided with a series of equally spaced conductive segments 526. The center to center spacing of the conductive segments 526 is arranged to be substantially the center to center spacing of the characters in the printed line which is being read. Riding against the face of the commutator bar 524 are two roller type contact members 528 and 530 which have a spacing between their points of contact equal to any multiple of the spacing of segments 526 plus one-half of the segment spacing.

Automatic firing of the system at the completion of scanning each character is under control of the contact member 528. The complete machine is set up so that contact member 528 will make contact with the advancing edge of a conducting segment of commutator 524 at a position substantially midway between characters on the paper 10. The conductive portion of commutator 524 will be grounded and brush 528 will be connected across a resistor 532 to a source of positive potential at terminal 534. The contact member 528 will also be connected to the terminal 534 through a capacitance 536 and a relay coil 538. When contact member 528 makes contact with a conductive segment of commutator 524, a transient current will flow through relay coil 538 and actuate an associated relay arm 540 to complete a circuit between relay contact 542 and a source of positive potential connected to a terminal 544. The potential from terminal 544 will then become previously defined potential P by virtue of a connection including leads 546, 548, relay arm 550, and relay contact 552. However, the potential from terminal 544 will also be applied through lead 554 connected with lead 546 and through the coil of a relay 556 to ground. Relay 556 is of the delayed closing type. When relay coil 538 is energized, the arm 558 of relay 556 will be actuated after a delay period to apply a potential from terminal 560 to relay contact 562 and then through the coil of a relay 564 to ground. When relay coil 564 is energized, the previously mentioned relay arm 550, together with additional relay arms 568 and 570, will be actuated to disconnect terminal 552 from terminal 544 and also to remove the connection between relay contacts 572 and 574 from positive sources of potential, thereby disabling the potential sources Y and Z, respectively.

The RC time constant of the capacitor 536 and the relay coil 538 is fixed such that the relay arm 540 will stay down long enough to insure that relay coil 564 will be energized long enough to insure that sources Y and Z are disconnected sufficiently to clear their respective circuits. This disconnection is also long enough to insure that no mask sector of the two hole variety will be recognized between characters where spacing is close enough to allow the last portion of one character to black out one hole and the first part of the next character to black out the other hole.

Changes in horizontal alignment with respect to the clearing signals are provided for by having the second contact member 530 connected to one relay arm 576 of a relay comprising relay coil 578. The relay coil 578 is connected to the output lead 305 of the fifth stage of the shape recognition circuits of Figure 7, the purpose of this connection being that the openings as in sectors V and VI are such in the particular arrangement of openings illustrated in Figure 2 that they will produce hits only when the characters are substantially centered in the area 26 shown on the mask in Figure 2. If other arrangements of openings are employed then relay coil 578 will be connected to whatever sector will produce possible hits when the character is substantially centered.

A determination of whether the bar 524 should be advanced or retreated with respect to the line of characters is accomplished by determining whether the relay coil 578 has been energized before or after the segmented commutator 524 indicates that the character should be substantially centered. It will be recalled that the contact member 530 is spaced from contact member 528 a multiple of the segment spacing plus a one-half space. Accordingly, as compared with the firing point between characters, the contact member 530 will make contact with a segment when the character should be substantially centered in the area 26. If contact is made by member 530 before coil 578 has been energized, the relay arm 576 will be in contact with relay contact 580 and current will flow through contact 580 and through the coil of a relay 582 to a connection with source Y. This energization of coil 582 will actuate associated relay arm 584 so that the latter makes contact with a relay contact 586 and a holding circuit is established from source Y through contact 586 to ground. With relay coil 582 continuing to be energized, a second relay arm 588 associated with coil 582 will be in contact with contact relay 590, which is interconnected with solenoid 518. Relay coil 578 will be eventually energized over line 305 if and when sectors V and VI produce a hit and a second relay arm 592 associated with relay coil 578 will establish contact with relay contact 594. It is not expected that sectors V and VI will produce hits on every character, but enough hits on frequently appearing characters are expected and will serve to keep the line of characters in alignment. Relay arm 592 is connected with source P and therefore when source P is applied to fire the system, relay coil 518 will be energized to indicate that the character was lagging and clockwise rotation of star wheel 510 will serve to advance the paper 10 relative to its support.

In the case that coil 578 connected to a common connection between lines 305 and 306 is energized before the contact member 530 makes contact with conducting segment then the relay arm 576 will be moved out of contact with relay contact 580 and there will be no opportunity for relay coil 582 to become energized. Accordingly, relay arm 588 will remain in contact with a relay contact 596, the latter being connected with solenoid 516. In this case when potential P is established to fire the system, the star wheel 510 will be rotated counterclockwise to retreat the paper relative to its support. This reflects the existing situation that the center of the letter appeared at the scanning means prior to the time that contact member 530 indicated it should be there.

It will be apparent from the foregoing that once a line of characters is aligned the apparatus will continue to keep the line in alignment. Furthermore, after scanning a few characters, the apparatus will draw itself into alignment, notwithstanding that the initial alignment was in error. For horizontal alignment, the apparatus will come into alignment from any position. For vertical alignment the line need only be within predetermined limits. The initial alignment may be accomplished by any conventional means and is not the subject of the present invention.

From an understanding of my invention in accordance with the above-described embodiment, it will be apparent that many other embodiments are possible. First, it will be apparent that the speed of operation of the above embodiment may be increased by replacing electromagnetic relays with electronic units having more rapid operating characteristics. It will be further apparent that the commutator and distributor devices can be replaced by electronic circuits which will perform the same function but more rapidly.

A significant embodiment of my invention may be to replace the scanning disk 18 of Figure 1 with a so-called flying-spot type of scanning apparatus. That is, referring to Figure 12, a mask 18′ may be provided with a single aperture 610 which will, in effect, sweep a series of dots in an arcuate path over a character 11 on the paper 10. (The aperture will sweep a line, but the output of the photocell may be gated to provide the equivalent of dots.) Moreover, a straight scanning line may be created by combining a fixed mask having a straight slit with a rotating mask having a radial slit. Inasmuch as the paper 10 will be caused to advance, on each successive revolution of the mask 18′, the series of dots will lie immediately adjacent the preceding series of dots. Thus, each scanning sweep will produce certain dots which produce light on the photocell 22 (Figure 1) and other dots which will produce no light on photocell 22, due to the fact that the flying spot is passing over a portion of the character 11. The dots which produce no light in the photocell may be termed "signal" dots, to distinguish from the dots which produce no signal. It will be apparent from the foregoing that the basic concept in this modification is to "paint" a picture of the character being analyzed in terms of signal dots. The picture of the character may be actually "painted" by recording the result of each scanning sweep of aperture 610 in a suitable memory device. For example, this may be as a series of magnetic flux cells along a track in a magnetic tape. Having recorded all of the scanning sweeps covering a given character, this recorded information may then be compared with reference information representing an arrangement of signal dots necessary to recognize each of the characters. For the most efficient comparison of information, the magnetic medium may take the form of a magnetic drum. In using a magnetic drum, the first scanning sweep may be recorded on one track of the drum and the following scanning sweep may be recorded in an adjacent track of the drum, and so forth, until a complete character has been scanned. The drum system may be arranged to record the complete stream of dots in a first track while simultaneously reading what is the first and subsequent dots of the second stream and re-writing these dots adjacent the first series of dots, but in a second track. Similarly, the second track may be arranged to re-write on the third, and so forth, for the width of about two or more characters. Thus, a continual picture of substantially the last two characters being read may be moving across the drum in much the same fashion as characters are caused to flow across an electric sign board. To conserve drum space, the just mentioned arrangement be altered slightly to record each successive scanning sweep in adjacent sectors of the same track rather than in adjacent tracks.

After the character has been recorded in magnetic form, the first character may then be reviewed to determine when it begins, when it ends, and the location of its top and bottom limits. A start character signal may be produced whenever a column in which no dot occurs is followed by a column in which one or more dots occur.

In the embodiment now being described, matching between the character being scanned and the various "shapes" or "sub-patterns" will be accomplished by comparing the stream of signal-no-signal dots being read from the now-aligned character on the drum with other streams of signal-no-signal dots permanently stored (for the given program) on another portion of the drum, each of such other streams representing one shape or sub-pattern. These shapes may be identical to those employed in the first embodiment, as in fact may the whole program. However, the storage of these shapes on a drum appears as what would be recorded if the shape were scanned in the same manner as the method already described for a character. In fact, if it is so desired, these shapes can be stored by precisely this means.

The actual means of comparing in this case may be coincidence detector circuits which emit a pulse when a signal dot occurs simultaneously in the two streams being compared. When a preset threshold number of such coincidences has been counted an output pulse is sent to the shape memory bank, indicating that the given shape has been recognized. The rest of the program may be carried out as in the first embodiment.

In addition, magnetic storage as in a magnetic drum may also be used to great advantage to perform the translating functions of the interpreter. This is accomplished by "looking up" the recognized set of conditions and transmitting to the output any desired binary coding for the character that this set of conditions implies. This look-up may be accomplished by recording all the sets of conditions that are to be encountered on the drum together with their proper associated output codings. Then this entire dictionary of condition codings is scanned for coincidence with the recognized set of conditions. Upon coincidence the associated output coding is gated to the output mechanism.

The just described embodiment may be preferred in many applications, since the disk-type scanning means may be replaced by entirely electronic scanning means, for with the exception of the order in which the lines are scanned, the required input is identical with that supplied by standard television systems. This means that the device need have no moving parts (except for the magnetic drum) and that the output rate of this apparatus may reasonably be expected to exceed 100 characters per second.

From the foregoing it will be apparent that by use of the principle underlying my invention it is possible to recognize among a very large number of different characters. Moreover, this recognition may be accomplished by using a relatively small number of different recognition shapes. For example, in the first described embodiment, using just 7 different sectors each with a different array of openings, $2^7$ different combinations are available simply by reason of the presence or absence of each sector. Moreover, in the case in which all sectors produce a hit but not at the same time, each may be considered to be distinct and there will be a possible selection of one of 5,040 different characters. This will be in the single case in which all sectors are present. However, if this example is extended to include the combinations of sectors and their order of appearance, the total number of different characters which may be recognized by just 7 different sectors is 13,699. While normally it will not be intended to recognize among 13,699 characters, nevertheless the very large assortment of recognition criteria makes possible the recognition of a relatively few characters (such as about 40 different characters) with the other of the 13,659 theoretical characters providing a considerable range or buffer zone for imperfections in the relatively few characters of the group being scanned.

Furthermore, the above figures ignore the original free choice of recognition shapes and the fact that conditions may be set up which require occurrences of a given shape before and after the occurrence of another shape.

In view of the fact that the basic scanning arrangement employed in my invention provides such a great number of characters which can be theoretically recognized, it is apparent that special type-faces are not required. It is also possible, to simplify programming of the interpreter by having more than one output terminal for a given character. For example, in Figure 8, it will be noted that B and G are each available on two terminals. Actually, these characters when properly shaped may appear on one set of terminals, while if distorted will appear on the other set of terminals. Normally, however, such sets of terminals will be connected together. The main purpose of special type-faces in prior art devices is generally to produce characters which will differ significantly in relatively simple respects.

It will be noted that a certain amount of automatic editing may be expected of a machine according to my invention. For example, the machine may command that any character which is underlined be omitted in transmission to the output mechanism. This is accomplished by simply assigning a shape and memory unit to recognition of an underline. When this shape is recognized, the output pulse is blocked by a relay or tube. Also, the insertion of special symbols may be used to tell the machine to perform such functions as to go up a line to read a word inserted in the space between double spaced lines of text, to go immediately to the next line of text, or to stop the machine.

The error indicator (circuit 60 of Fig. 5) may be simply a light which will flash or a device which will emit sound if an impossible character is "recognized." That is, an interpreter similar to that shown in Fig. 8 may be equipped with additional relay contacts which would be identifiable with characters not existing in the list of characters being scanned. These contacts may be connected to the error indicator to operate the latter.

A detailed description of the physical components of my invention is now essentially complete. However, the potentialities of this invention will not be completely appreciated if it is not clearly understood that this device is essentially an electronic computer which is specially designed to handle pattern analysis problems. This means that it is not reasonable in this specification to state explicitly just which patterns the invention can analyze and which ones it cannot, just as it is not reasonable to state all the mathematical problems a digital computer can or cannot handle. However, from what is said in this specification, those skilled in the art will understand how programming is carried out.

The word "program" in the case of this invention is intended to include the selection of the sub-patterns (referred to above as the "shapes") used to be matched against the pattern to be analyzed, the selection of the "conditions" which will be used as a basis for decisions in the interpreter, and the selection of which of these conditions will be used to distinguish any given pattern to be recognized from other such patterns. A complete description of the art of programming cannot be recorded here. However, as an example of the factors a programmmer must consider, the major factors encountered in designing a program to read a typewritten standard alphabet will include (1) the number of characters to be distinguished, (2) the distinctiveness or "dissimilarity" of these characters, (3) the quality of print to be expected in terms of the number and identity of portions of characters that are likely to be scarcely visible or entirely missing, (4) the amount of residual vertical misalignment uncorrected by the automatic control, (5) the number of sub-patterns (sectors) available for comparison purposes, (6) the number of memory positions available (thyratrons in the first embodiment), (7) the amount of equipment available for setting up conditions, and (8) the capacity of the translation portion of the interpreter.

By use of the hereinabove invention it is also possible to read handwritten editing entries and the like. This is due to the fact that each of the various fundamental aperture shapes may be duplicated in several sectors, except that the radial position of the shapes be varied to tolerate vertical misalignment of parts of images. For example, let it be supposed that an E has been inserted by hand into a line of typed characters and let it be further assumed that the E is less tall than a typed E would be, due to inaccuracy of the handwriting. Referring to Figure 11, sectors II, VII, III, IV, V and IX will produce hits on an E. Now, if the shapes of each of these sectors is triplicated (making a mask of 21 sectors including sectors I, VI and VIII) with each similar shape at varying radial distances, an E will be recognized notwithstanding variation in the position of the horizontal lines thereof. The same reasoning applied to other characters being read. Wherever similar shapes are also connected to correct for vertical misalignment, a handwritten character may produce an actually undesired alignment operation. However, alignment correction caused by one character will normally be insufficient to prevent reading the next character, and alignment normally will be regained upon reading the next character.

In the case of handwritten inserts and the like which may vary in the horizontal direction the same result is obtained but without need to duplicate sectors since like sectors will repeatedly look for the image parts concerned, and evenutally the part concerned will be adjacent the position where the sector "looks." It is sequence only and not the horizontal physical spacing of the character elements which is important.

It will be understood that the foregoing illustrated embodiments are not intended to limit the scope of my invention. The true scope of my invention is to be determined from the appended claims.

I claim:

1. In reading apparatus, means to scan relatively continuously moving conventional intelligence-bearing characters to be read, the scanning means comprising means for successively scanning portions of each character to be read during movement of the character, means comprising detecting means for producing signals whenever the scanning means senses predetermined portions of a character, and means comprising interpreter means responsive to signals produced by the detecting means following scanning of a complete character to provide an output signal indicative of the character read.

2. In reading apparatus, means to support a member bearing standard type intelligence-bearing characters to be read, a scanning means for scanning the characters to be read, means producing continuous relative advancing movement between said characters and said scanning means whereby said scanning means scans the characters successively during relative movement therebetween, said scanning means including a plurality of sensing means each different in arrangement on the scanning means, each sensing means being identifiable with predetermined strokes and shapes of the standard type intelligence-bearing characters, means comprising detector means adapted to produce a signal whenever a sensing means senses a predetermined portion of a character identifiable therewith, and means comprising interpreter means responsive to accumulated signals produced by the detector means to provide an output signal indicative of a character which has been read.

3. In reading apparatus, means to support a member bearing items to be read, means for driving said support to continuously move said item bearing member, a cyclically movable scanning member for scanning the items to be read during continuous movement of said item bearing member, a plurality of sensing means arranged on the scanning member, each of the sensing means being different in arrangement on the scanning member, each sensing means being identifiable with predetermined portions of the items to be read, means to move the scanning member in cycles of travel, means comprising detector means adapted to produce a signal whenever a sensing means senses a predetermined portion of an item identifiable therewith, and means comprising interpreter means responsive to accumulated signals produced by the detector means upon complete scanning of an entire item by the plurality of sensing means to provide an output signal indicative of an item which has been read.

4. In reading apparatus, support means adapted to support a member bearing items to be read, a cyclically movable scanning member for scanning the items to be read, a plurality of sensing means of varying shape arranged in sectors of the scanning means, the sensing means in each sector being identifiable with predetermined strokes and component segments of the items to be read less than the whole item, means to move the scanning member in cycles of travel, means for driving the item support relative to the scanning means to continuously move the item bearing member during scanning, whereby a fractional portion of an item may be scanned by each of the plurality of sensing means and then successive fractional portions of the item may be scanned likewise in sequence, means comprising detector means adapted to produce a signal whenever one of the plurality of sensing means senses a predetermined portion of an item identifiable therewith, means comprising interpreter means responsive to accumulated signals produced by the detector means upon complete scanning of an item by the plurality of sensing means, the interpreter means being adapted to produce an output signal indicative of an item which has been scanned.

5. In reading apparatus, support means adapted to support a member bearing items to be read, driving means for said support means to continuously move said item bearing member, a cyclically movable scanning member for scanning the continuously moving items to be read, a plurality of sensing apertures of varying shape arranged in sectors of the scanning means, the sensing apertures in each sector being identifiable with predetermined strokes and component segments comprising portions less than the whole of the items to be read, means to move the scanning member in cycles of travel to scan said sensing apertures a plurality of times over each of said continuously moving items, whereby a fractional portion of an item may be scanned by each of the plurality of sensing apertures and then successive fractional portions of the item along the direction of travel of the item may be scanned likewise in sequence, means comprising detector means adapted to produce a signal whenever one of the plurality of sensing apertures senses a predetermined portion of an item identifiable therewith, means comprising interpreter means responsive to accumulated signals produced by the detector means upon complete scanning of an entire item by the plurality of sensing means, the interpreter means being adapted to produce an output signal indicative of an item which has been scanned.

6. In reading apparatus, means to scan items to be read, the scanning means comprising means for successively scanning portions of an item to be read, means comprising detecting means for producing signals whenever the scanning means senses predetermined portions of an item, means comprising interpreter means responsive to signals produced by the detecting means following scanning of an item to provide an output signal indicative of the item read, and means responsive to misaligned items being scanned to compensate for misalignment of items being read above and below lines of the items.

7. In reading apparatus, means to scan items to be read, the scanning means comprising means for successively scanning portions of an item to be read, means comprising detecting means for producing signals whenever the scanning means senses predetermined portions of an item, means comprising interpreter means responsive to signals produced by the detecting means following scanning of an item to provide an output signal indicative of the item read, and means adapted to compensate for misalignment of items being read above and below lines of the items, the misalignment compensating means including means responsive to the occurrence of predetermined portions of an item above or below the aligned position of the predetermined portions.

8. In reading apparatus, means to scan items to be read, the scanning means comprising means for successively scanning portions of an item to be read, means comprising detecting means for producing signals whenever the scanning means senses predetermined portions of an item, means comprising interpreter means responsive to signals produced by the detecting means following scanning of an item to provide an output signal indicative of the item read, and means responsive to misaligned items being scanned to compensate for misalignment of items being read in the direction of lines of the items.

9. In reading apparatus, means to scan items to be read, the scanning means comprising means for successively scanning portions of an item to be read, means comprising detecting means for producing signals whenever the scanning means senses predetermined portions of an item, means comprising interpreter means responsive to signals produced by the detecting means following scanning of an item to provide an output signal indicative of the item read, and means adapted to compensate for misalignment of items being read in the direction of lines of the items, the misalignment compensating means including means for detecting the occurrence of a predetermined portion of an item before or following the occurrence of a signal representing the scanning of the item in an aligned position.

10. In reading apparatus, support means adapted to support a member bearing items to be read, a cyclically movable scanning member adapted to scan the items to be read, a plurality of sensing means of varying shape arranged in sectors of the scanning means, the sensing means in each sector being identifiable with predetermined portions of the items to be read, means to move the scanning member in cycles of travel, means to move the item support relative to the scanning means, whereby a fractional portion of an item may be scanned by each of the plurality of sensing means and then successive fractional portions of the item may be scanned likewise in sequence, means comprising detector means adapted to produce a signal whenever one of the plurality of sensing means senses a predetermined portion of an item identifiable therewith, means comprising interpreter means responsive to accumulated signals produced by the detector means, the interpreter means being adapted to produce an output signal indicative of an item which has been scanned, and means for compensating for misalignment of items being read, the compensating means being connected with the detector means and arranged to be energized upon detection of predetermined portions of items by predetermined ones of the plurality of sensing means.

11. In reading apparatus, means to scan continuously moving conventional intelligence-bearing characters to be read, means for scanning said scanning means over each character a plurality of times to successively scan a plurality of discrete portions of each character located along the direction of travel of the character, means comprising detecting means for producing signals whenever the scanning means senses predetermined portions of the character, and means comprising interpreter means responsive to signals produced by the detecting means following scanning of all portions of a complete character to provide an output signal indicative of the character read.

12. Apparatus as in claim 11 in which the interpreter means comprises a plurality of relays intercoupled in a network with said detecting means to be energized by a preselected sequence and combination of said detecting means signals to establish a signal routing through said relays to a preselected output terminal indicative of the item read.

13. In reading apparatus, means to support a member bearing items to be read, means for continuously moving said item bearing member, a cyclically movable scanning member for scanning the items to be read, a plurality of sensing means arranged on the scanning member, each of the sensing means being different in arrangement on the scanning member, each sensing means being identifiable with predetermined portions less than the whole of an item to be read, means to move the scanning member in cycles of travel to scan a plurality of discrete item segments of each item disposed along the direction of travel of the items, means comprising detector means adapted to produce a signal whenever a sensing means senses a predetermined portion of an item identifiable therewith, a distributor means having a plurality of terminals, means including the distributor means for connecting each terminal to receive an energizing signal if a predetermined one of the sensing means senses a predetermined portion of an item, and means comprising interpreter means connected with the terminals and responsive to accumulated signals produced by the detector means upon complete scanning of all segments of an item to provide an output signal indicative of an item which has been read.

14. In reading apparatus, means for scanning a series of advancing items to be read having means for sensing the items, means producing signals on sensing of predetermined characteristics of the items by said scanning means, means responsive to said signals producing an output signal indicative of the item read, and means for compensating for misalignment of individual items in the series along and perpendicular to their line of travel, said misalignment compensating means including means responsive to the occurrence of an item disposed out of the aligned position of the item.

15. In reading apparatus, means for scanning items to be read having means for sensing the items, means for progressively advancing the items to be scanned, means for producing signals upon sensing of predetermined characteristics of the items by said scanning means, means responsive to said signals to provide an output signal indicative of the item read, and means to compensate for misalignment of items being read comprising means responsive to the occurrence of an item in a position displaced from the aligned position of the item.

16. In reading apparatus, means to support a member bearing items to be read, means for scanning the items on said item bearing member having means for sensing the items, means producing signals upon sensing of an item by said scanning means, means responsive to said signals to produce an output signal indicative of the item read, and means to compensate for misalignment of items being read comprising detecting means intercoupled with said scanning means for producing correction signals on sensing of an item displaced on said item bearing member from the aligned position of the item, and means coupled to said supporting means for said item bearing member and responsive to said correction signals to shift said supporting means and dispose the displaced item in aligned position in the field of said scanning means.

DAVID H. SHEPARD.

References Cited in the file of this patent

UNITED STATES PATENTS

| Number | Name | Date |
|---|---|---|
| 1,000,078 | Cummings et al. | Aug. 8, 1911 |
| 1,815,986 | Parker | July 28, 1931 |
| 1,815,996 | Weaver | July 28, 1931 |
| 1,915,993 | Handel | June 27, 1933 |
| 2,198,233 | Snyder | Apr. 23, 1940 |
| 2,213,769 | Ruska | Sept. 3, 1940 |